Sept. 13, 1960    E. R. SWENSON    2,952,092
FISH LURE

Filed May 14, 1959    2 Sheets-Sheet 1

INVENTOR
Edward R. Swenson.

BY Stone + Mack.
ATTORNEYS

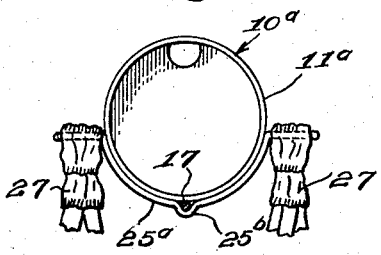
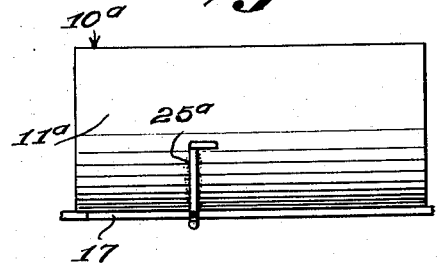
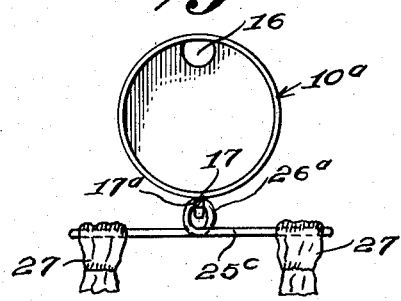
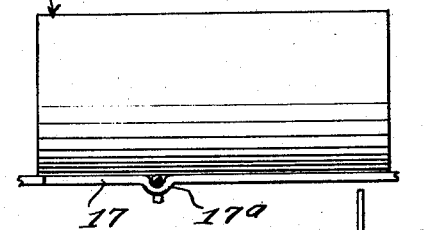
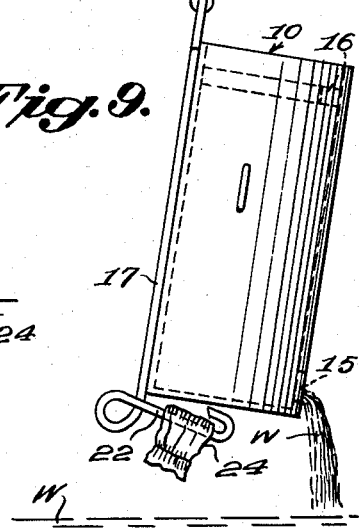
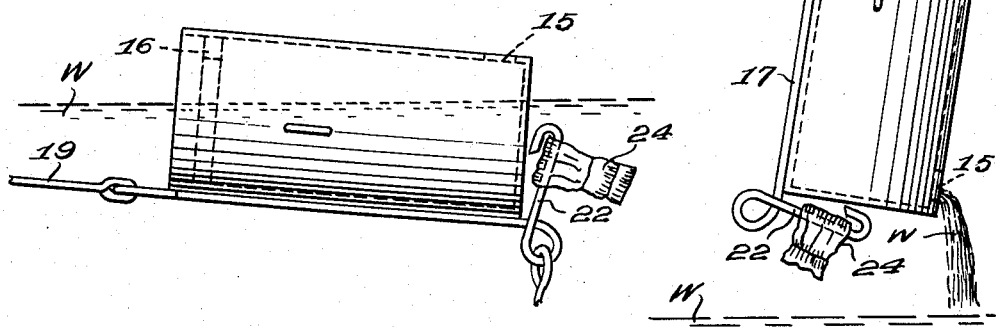
INVENTOR.
Edward R Swenson United States Patent Office 2,952,092
Patented Sept. 13, 1960

2,952,092
FISH LURE
Edward R. Swenson, 919 Girard St., Metropolis, Ill.
Filed May 14, 1959, Ser. No. 813,293
2 Claims. (Cl. 43—42.06)

This invention relates to a fish lure.

A primary feature of the invention is the provision of a lure of the plug type and which is particularly characterized in its adaption to a floating buoyant action or under water trolling action at the will of a fisherman.

A further feature of the invention is the provision of a fish lure which is characterized in its ability to attract fish thereto.

A still further feature of the invention is the provision of a fish lure which is relatively simple in construction whereby same is capable of manufacture at relatively low cost.

Other novel features of the invention will become apparent in the course of the following detailed description, taken in connection with the accompanying drawing wherein:

Fig. 4 is a fragmentary end elevational view of a modified embodiment of the lure;

Fig. 5 is a fragmentary side elevation view of the embodiment of the lure of Fig. 4;

Fig. 6 is a fragmentary end elevational view of a further modified embodiment of the invention;

Fig. 7 is a side elevational view of the embodiment of the lure of Fig. 6;

Fig. 8 is a fragmentary side elevational view corresponding to the embodiment of the lure of Figs. 1 to 3 showing the action of the lure when being trolled in the water;

Fig. 9 is a fragmentary side elevational view corresponding to the embodiment of the lure of Figs. 1 to 3 showing the disposition of the lure in the drawing of water therefrom.

Figure 1:
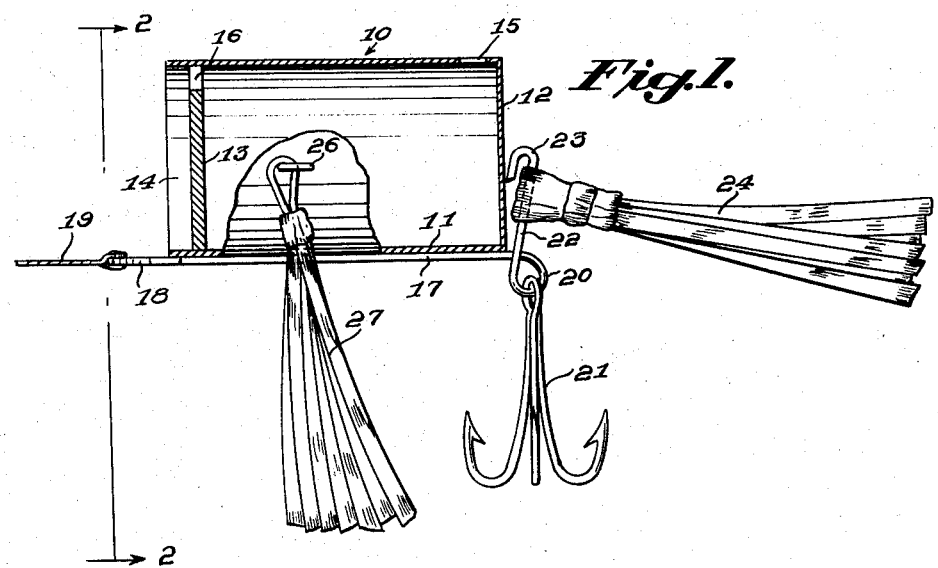
Fig. 1 is a central longitudinal vertical sectional view of the improved lure as observed in the plane of line 1—1 on Fig. 2, a portion of the figure being in side elevation.

Referring now in detail to the drawing, the improved lure will be seen to comprise an elongated hollow body 10 which includes a side wall 11, an end wall 12 which is flush with one end of the side wall 11 and a second end wall 13 which is disposed inwardly of the other end of the side wall 11 in the provision of a recess 14. At this point, it is to be observed that the body 10 is of ovoid form in cross section with the smaller end downwardly which facilitates floating of the lure in the water.

The side wall 11 is provided with an aperture 15 adjacent the end wall 12 and which is disposed in the uppermost portion of the casing and whose center is in the vertical longitudinal medial plane of the casing and the end wall 13 is provided with an aperture 16 immediately within the side wall 11 and whose center is in said vertical longitudinal plane.

An elongated wire rod 17 extends lengthwise of the body 10 and is suitably secured to the lower side portion thereof with its axis in the said vertical longitudinal medial plane.

The rod 17 extends forwardly of the front end of the body 10 and terminates in an eye 18 to which is secured one end of a trolling line 19.

The opposite or rear end of the rod 17 is bent upon itself in the provision of an eye 20 to which is secured a depending multiple hook 21.

The rod 17 extends beyond the eye 20 upwardly adjacent to and exteriorly of the end wall 12 in the provision of a shank 22 which terminates in a downwardly opening hook 23 and a rear skirt 24 is secured to the said shank 22 and in a position above the hook 21.

A wire rod 25 extends transversely through the side wall 11 and is provided with a hook 26 at each end thereof externally of the body 10 and to which is secured a side skirt 27.

In the use of the improved lure, same will float in the water for an indefinite period of time when same is not given movement by the trolling line 19 for the reason that the apertures 15 and 16 will be above the water in the floating action of the lure.

The ovoid form of the body 10 provides for effective floating action of the body 10 since the lower portion thereof has a convex surface similar to that of a boat.

The lure is designed for buoyant floating action for any period of time that may be desired by a fisherman, and when it is desired to have the lure operate under water, it is necessary only for the fisherman to exert a retrieving action on the line 19 whereupon water will be deflected into the zone of aperture 16 and the aperture 15 will provide for escape of air from within the body 10 whereby same will become filled with water.

The skirts 24 and 27, and particularly the latter, serve to attract fish to the lure since same simulate the wings of a butterfly, bird, or the legs of a frog.

While the trolling line 19 is shown as being connected to the lure body in line with the bottom thereof, the invention is not limited thereto, since same may be connected to the body at any other point with the action of the body as above set forth.

Figure 2:
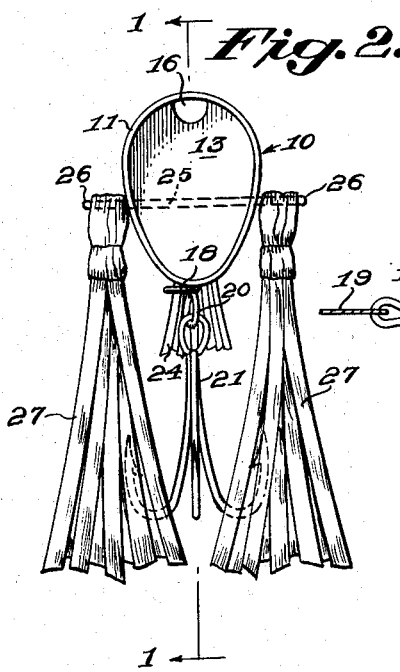
Fig. 2 is an end elevational view as observed in the plane of line 2—2 on Fig. 1.
Figure 3:
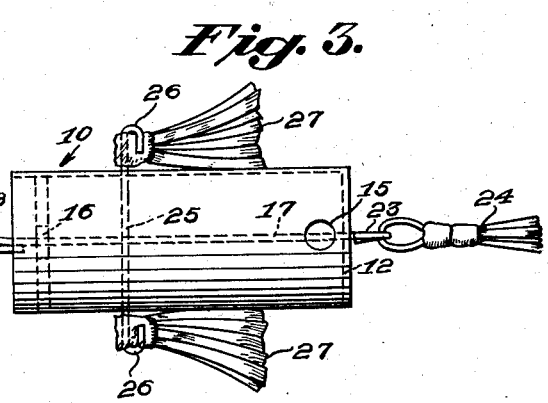
Fig. 3 is a top plan view with the rear skirt broken away.

While the body 10 of Figs. 1 to 3 is shown as being of ovoid form it might well be of circular form in cross section as is shown in Figs. 4 to 7 wherein the body is designated 10a.

While in Figs. 1 to 3 the side skirt supporting rod 25 extends transversely through the wall of the body side wall 11 same may be of arcuate form as shown in Figs. 4 and 5 and which is designated 25a. This modified form of rod embraces the lower portion of the side wall 11a and is soldered thereto, and same is provided with a downwardly deflected portion 25b through which the rod 17 extends.

In accordance with the modified embodiment of Figs. 6 and 7, the rod 17 is provided with a downwardly deflected portion 17a and the rod 25c which supports the side skirts 27 is provided with a loop 26a pivotally supported in the deflected portion 17a.

As is shown in Fig. 8, the lure body 10 when being trolled through the water W has its axis at an angle to the surface of the water which is due to same being heavier at the rear end thereof as occasioned by hooks 21 and skirt 24. Accordingly, when the first few drops of water enter aperture 16 same naturally flows to the rear of the body, causing the rear end thereof to sink lower in the water. When the necessary amount of water enters the body to cause the rear end thereof to settle low enough in the water to cause aperture 15 to go below the water level, water will then enter the aperture 15 and the remaining volume of air in the body 10 will discharge through aperture 16 which will still be above water level. Upon the body 10 becoming completely full of water, the body will sink in the absence of any bubbles.

Upon retrieval of the bait or lure as shown in Fig. 9 all of the water W drains through aperture 15 and the drainage is aided by admission of air into the aperture 16.

From the above, it is apparent that aperture 15 at one end of body 10 is a water passing aperture in that water enters same in the submerging of the body 10 and water drains through same in the removal thereof from within the body and aperture 16 is essentially an air aperture to facilitate passage of water into the body as well as removal of water therefrom. The highly simple structure is such that it will remain a buoyant lure as long as desired by a fisherman. However, upon the lure being given action to attract fish and it has been unsuccessful, it can be given more violent action which will cause it to fill with water and lose its buoyancy and sink, thus becoming an underwater bait to attract fish on its return to a fisherman, who then lifts same from within the water and it will drain as shown in Fig. 9 ready for renewed buoyant action.

I claim:

1. A fish lure comprising an elongated hollow body of uniform cross section throughout its length and including a transversely curved side wall and opposite front and rear end walls, said front wall being flat and at right angles to the axis of said body, a trolling line secured to the advance end of the body for trolling action thereof, said body being counterweighted for axial angular disposition thereof relative to the surface of the water with the rear end thereof lowermost in a floating or trolling action, said body being provided with a pair of apertures, one of which is disposed adjacent the front end thereof and the second of which is disposed adjacent the rear end thereof, both of said apertures being disposed at the upper side of the body out of water in a floating action of the lure, and the body being otherwise imperforate, and said front wall being inset from the adjacent end of said hollow body defining a recess for diverting water into the range of the first named aperture, whereby upon trolling of the lure water enters the hollow body through said first named aperture with corresponding escape of air through the second named aperture and finally the lure sinks into the water.

2. A fish lure according to claim 1, wherein said first named aperture is in said front wall immediately within said hollow body, and wherein said second named aperture is in said transversely curved side wall adjacent said rear end wall.

References Cited in the file of this patent

UNITED STATES PATENTS

| | | |
|---|---|---|
| 810,822 | Tinkess | Jan. 23, 1906 |
| 1,056,494 | Blee | Mar. 18, 1913 |
| 1,249,194 | Race | Dec. 4, 1917 |
| 1,522,450 | Hayes | Jan. 6, 1925 |
| 1,777,594 | Weller | Oct. 7, 1930 |
| 2,008,004 | Catarau | July 16, 1935 |
| 2,028,050 | De Witt | Jan. 14, 1936 |
| 2,235,331 | Pugh | Mar. 18, 1941 |
| 2,256,813 | Mikina | Sept. 23, 1941 |
| 2,473,142 | Gilmore | June 14, 1949 |
| 2,546,516 | Nardi | Mar. 27, 1951 |
| 2,549,077 | Garth | Apr. 17, 1951 |
| 2,629,960 | Baxter | Mar. 3, 1953 |
| 2,791,058 | Bettini | May 7, 1957 |